United States Patent
Sasaki (10) Patent No.: US 9,402,287 B2
(45) Date of Patent: Jul. 26, 2016

(54) SWITCHING CONVERTER WITH LIGHT SOURCE DIMMING FUNCTION

(71) Applicant: ROHM CO., LTD., Ukyo-Ku, Kyoto (JP)

(72) Inventor: Yoshikazu Sasaki, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 14/928,333

(22) Filed: Oct. 30, 2015

(65) Prior Publication Data

US 2016/0128148 A1    May 5, 2016

(30) Foreign Application Priority Data

Nov. 4, 2014  (JP) ................................. 2014-224444

(51) Int. Cl.
| | |
|---|---|
| H05B 37/02 | (2006.01) |
| H05B 33/08 | (2006.01) |
| G02F 1/1335 | (2006.01) |

(52) U.S. Cl.
CPC .......... *H05B 33/0815* (2013.01); *G02F 1/1336* (2013.01); *H05B 33/0845* (2013.01)

(58) Field of Classification Search
None
See application file for complete search history.

(56) References Cited

U.S. PATENT DOCUMENTS

| | | | | |
|---|---|---|---|---|
| 7,035,119 B2* | 4/2006 | Koike | ............... | H02M 3/33523 |
| | | | | 363/19 |
| 8,339,067 B2* | 12/2012 | Lin | .................... | H05B 33/0818 |
| | | | | 315/291 |
| 8,508,150 B2* | 8/2013 | Kuo | ................... | H05B 33/0818 |
| | | | | 315/291 |
| 9,030,114 B2* | 5/2015 | Murakami | ......... | H05B 33/0818 |
| | | | | 315/224 |
| 2008/0278092 A1* | 11/2008 | Lys | .................... | H05B 33/0815 |
| | | | | 315/247 |

FOREIGN PATENT DOCUMENTS

| | | |
|---|---|---|
| JP | 2003153529 A | 5/2003 |
| JP | 2004047538 A | 2/2004 |

* cited by examiner

*Primary Examiner* — Alexander H Taningco
*Assistant Examiner* — Nelson Correa
(74) *Attorney, Agent, or Firm* — Cantor Colburn LLP (57) ABSTRACT

When a detection voltage $V_{CS}$ that corresponds to a voltage drop across a detection resistor $R_{CS}$ exceeds a first threshold value $V_{ADIM}$, a current limit comparator asserts a reset pulse. A zero current detection circuit asserts a set pulse configured as an instruction to turn on a switching transistor. A logic circuit generates a control pulse based on the reset pulse and the set pulse. When a transition occurs in a dimming pulse from an on level to an off level in a period in which the control pulse is set to the on level, the dimming pulse adjusting unit delays this transition to a next off period of the control pulse.

12 Claims, 11 Drawing Sheets

SWITCHING CONVERTER WITH LIGHT SOURCE DIMMING FUNCTION

CROSS-REFERENCE TO RELATED APPLICATIONS

The present invention claims priority under 35 U.S.C. §119 to Japanese Application No. 2014-224444, filed Nov. 4, 2014, the entire content of which is incorporated herein by reference.

BACKGROUND OF THE INVENTION

1. Field of the Invention

The present invention relates to a switching converter.

2. Description of the Related Art

Figure 1:
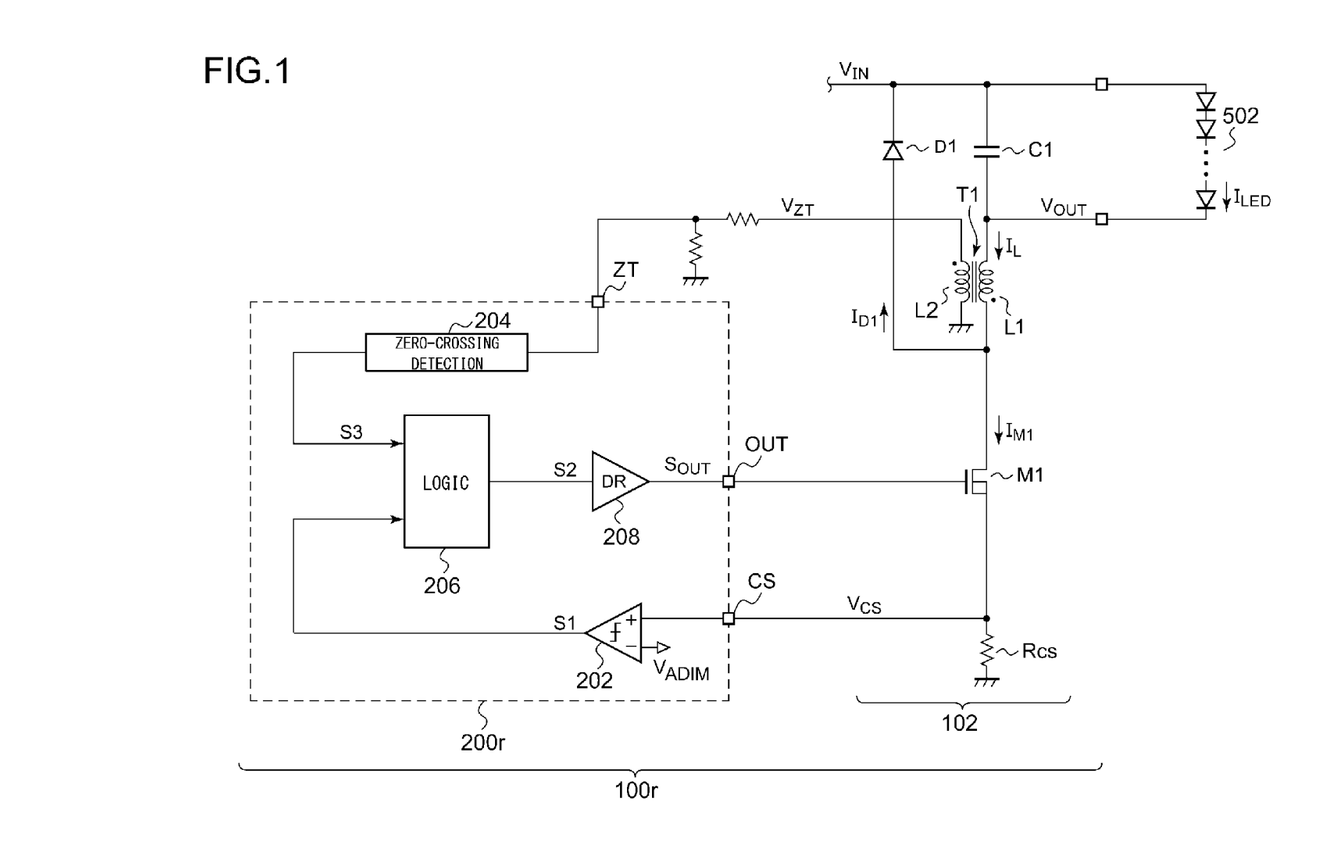
FIG. 1 is a circuit diagram showing a step-down switching converter investigated by the present inventors.

As a backlight of a liquid crystal panel or as an illumination device, semiconductor light sources such as LEDs (light-emitting diodes) have been becoming popular. In recent years, in the field of LED illumination devices, the development of step-down switching converters has been advancing. FIG. 1 is a circuit diagram showing a step-down switching converter investigated by the present inventors. A switching converter 100r receives an input voltage $V_{IN}$ from an unshown power supply, and steps down the input voltage $V_{IN}$ thus received, so as to output an output voltage $V_{OUT}$ to an LED light source 502 that functions as a load. Furthermore, the switching converter 100r stabilizes a current (which is referred to as a "load current" or "driving current") that flows through the LED light source 502 to a target value $I_{REF}$. For example, the LED light source 502 is configured as a light-emitting diode (LED) string. The switching converter 100r sets the target current value $I_{REF}$ of the load current $I_{LED}$ according to a target luminance set for the LED string.

The switching converter 100r includes an output circuit 102 and a control circuit 200r. The output circuit 102 includes a smoothing capacitor C1, a rectifier diode D1, a switching transistor M1, an inductor L1, an auxiliary winding L2, and a detection resistor $R_{CS}$.

In the on period of the switching transistor M1, a current that flows through the switching transistor M1 also flows through the detection resistor $R_{CS}$. A voltage drop (detection voltage) $V_{CS}$ across the detection resistor $R_{CS}$ is fed back to a current detection (CS) terminal of the control circuit 200r.

The control circuit 200 includes a current limit comparator 202, a zero current detection circuit 204, a logic circuit 206, and a driver 208.

Figure 2:
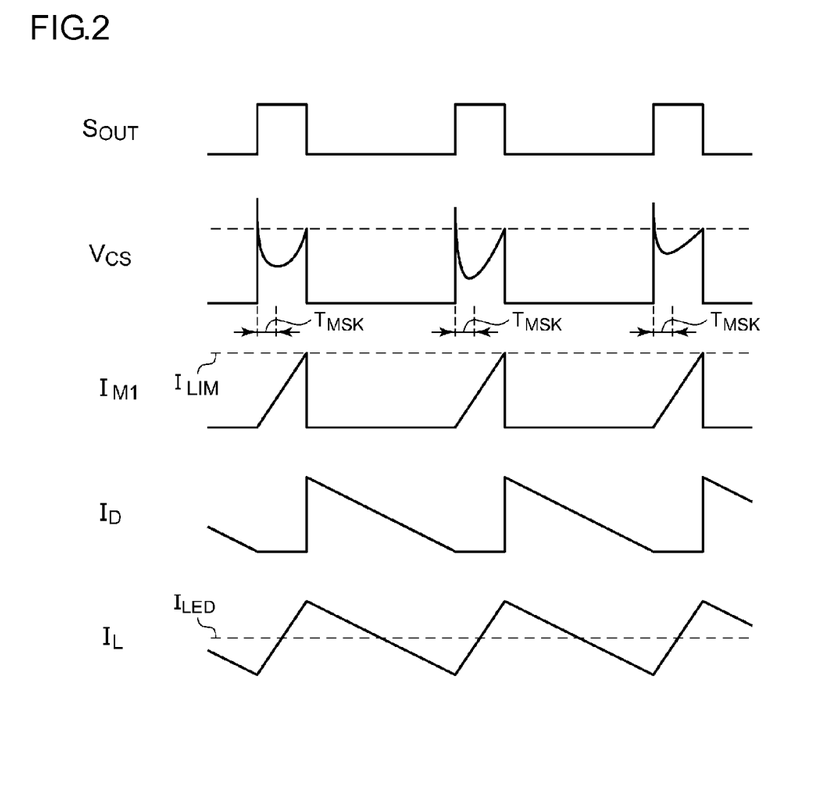
FIG. 2 is an operation waveform diagram showing the operation of the switching converter shown in FIG. 1.

FIG. 2 is an operation waveform diagram showing the operation of the switching converter 100r shown in FIG. 1. During a period in which the switching transistor M1 is turned on (on period), the coil current $I_L$ corresponds to a current $I_{M1}$ that flows through the switching transistor M1, which flows through the LED light source 502, the inductor L1, the switching transistor M1, and the detection resistor $R_{CS}$. As the coil current $I_L$ increases, the current detection signal $V_{CS}$ rises. The current limit comparator 202 compares the current detection signal $V_{CS}$ with a target voltage $V_{ADIM}$ that is set according to the target current value $I_{REF}$. When the current detection signal $V_{CS}$ reaches the target voltage $V_{ADIM}$, i.e., when the coil current $I_L$ reaches a limit current $I_{LIM}$ (=$V_{ADIM}$/$R_{CS}$), a limit current detection signal S1 is asserted (e.g., set to high level). In the on period, the energy stored in the inductor L1 increases.

When the limit current detection signal S1 is asserted, the logic circuit 206 switches a pulse signal S2 to an off level (e.g., low level) corresponding to the off state of the switching transistor M1. The driver 208 turns off the switching transistor M1 according to the pulse signal S2.

During an off period of the switching transistor M1, the coil current $I_L$ corresponds to a current $I_{D1}$ that flows through the rectifier diode D1, which flows through the LED light source 502, the inductor L1, and the rectifier diode D1. With the passage of the off time, the energy stored in the inductor L1 decreases, which decreases the coil current $I_L$.

The auxiliary winding L2 is coupled with the inductor L1, which forms a transformer T1. A voltage $V_{ZT}$ at the auxiliary winding L2 is input to a zero-crossing detection (ZT) terminal of the control circuit 200r. A zero current detection circuit 204 detects, based on the voltage $V_{ZT}$ across the auxiliary winding Lz, a state in which the coil current $I_L$ that flows through the inductor L1 becomes zero (zero-crossing point). In this state, the zero current detection circuit 204 asserts a zero-crossing detection signal S3.

When the zero-crossing detection signal S3 is asserted, the logic circuit 206 switches the pulse signal S2 to an on level (e.g., high level) corresponding to the on state of the switching transistor M1. The driver 208 turns on the switching transistor M1 according to the pulse signal S2.

The control circuit 200r repeats the aforementioned operation. The load current $I_{LED}$ is obtained by smoothing the coil current $I_L$ by means of a smoothing capacitor C1. With such an arrangement, the target current value $I_{REF}$ is represented by $I_{LIM}/2$.

As shown in FIG. 2, immediately after the output pulse signal $S_{OUT}$ of the driver 208 transits to the on level, there is a great sudden increase in the current detection signal $V_{CS}$ due to surge noise. In order to prevent the output (limit current detection signal) S1 of the current limit comparator 202 from being asserted before the coil current $I_L$ reaches the limit current $I_{LIM}$, a mask time $T_{MSK}$ having a predetermined length is set immediately after the switching transistor M1 is turned on. During the mask time $T_{MSK}$, the comparison result obtained by the current limit comparator 202 is ignored. This operation is also referred to as "leading edge blanking (LEB)".

Known methods that can be employed by the switching converter 100r for controlling the luminance (light amount) of the LED light source 502 include an analog dimming method and a PWM dimming method. In the analog dimming method, the current value of the load current $I_{LED}$ is adjusted by adjusting the target voltage $V_{ADIM}$ so as to adjust the luminance.

In the PWM dimming method, the load current $I_{LED}$ is switched on and off with a variable duty ratio. Specifically, a dimming pulse S4 having a duty ratio that corresponds to the luminance is input to a PWM terminal. The dimming pulse S4 has a frequency that is sufficiently lower than that of a gate pulse $S_{OUT}$ of the switching transistor M1. During a period in which the dimming pulse S4 is set to high level, the switching transistor M1 performs a switching operation according to the limit current detection signal S1 and the zero-crossing detection signal S3. In this period, the LED light source 502 emits light with a luminance that corresponds to the load current $I_{LED}$. During a period in which the dimming pulse S4 is set to low level, the switching transistor M1 suspends the switching operation. In this period, the load current $I_{LED}$ becomes zero, which turns off the LED light source 502. Thus, by changing the duty ratio of the dimming pulse S4 in a range between 0% and 100%, such an arrangement is capable of changing the luminance of the LED light source 502.

Figure 3A:
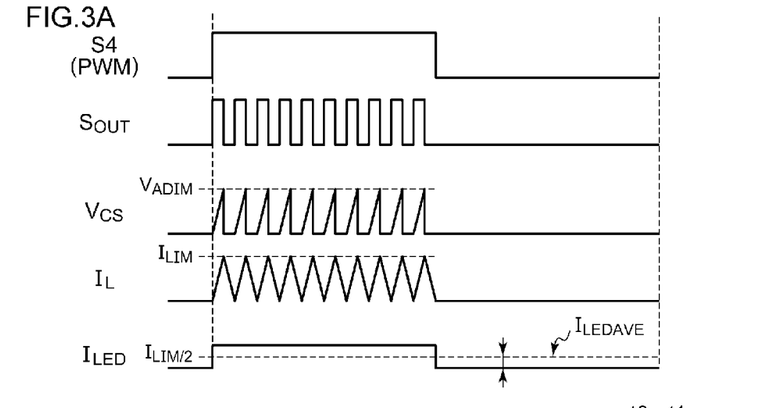
FIGS. 3A through 3C are waveform diagrams each showing a PWM dimming operation.
Figure 3B:
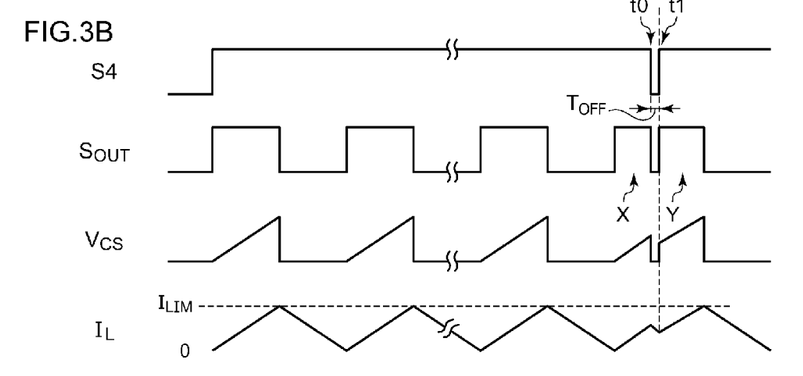
Figure 3C:
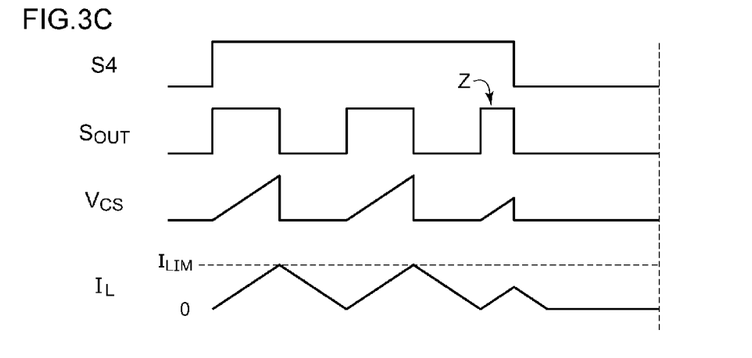

FIGS. 3A through 3C are waveform diagrams each showing the operation using the PWM dimming method. FIGS. 3A through 3C each show the waveforms of a dimming pulse S4

(PWM), an output pulse $S_{OUT}$, a current detection signal $V_{CS}$ at a CS terminal, a coil current $I_L$, a load current $I_{LED}$, and an average value $I_{LEDAVE}$ of the load current $I_{LED}$. It should be noted that the vertical axis and the horizontal axis shown in the waveform diagrams and time charts in the present specification are expanded or reduced as appropriate for ease of understanding. Also, each waveform shown in the drawing is simplified or emphasized for ease of understanding.

First, description will be made with reference to FIG. 3A regarding an ordinary dimming operation. During a period in which the dimming pulse S4 is set to high level, a so-called soft-switching operation is performed such that the coil current $I_L$ varies between 0 and a peak $I_{LIM}$. In this period, the load current $I_{LED}$ is represented by $I_{LIM}/2$.

With the duty ratio of the dimming pulse S4 as α %, the average value $I_{LEDAVE}$ of the load current $I_{LED}$ for each cycle of the dimming pulse S4 is represented by the following Expression. Such an arrangement is capable of changing the average value $I_{LEDAVE}$ in a substantially linear manner with respect to the duty ratio of the dimming pulse.

$$I_{LEDAVE}=I_{LED}\times\alpha/100.$$

The present inventors have investigated such a PWM dimming operation, and have come to recognize the following two problems. First, description will be made with reference to FIG. 3B regarding the first problem. It should be noted that there is a difference in the time scale between FIGS. 3A and 3B.

FIG. 3B shows a state in which the dimming pulse S4 has a duty ratio of almost 100%. Description will be made directing attention to the final pulse X of the output pulses $S_{OUT}$ in a given cycle of the dimming pulse S4.

The dimming pulse S4 transits to low level in a period in which the final pulse X is set to high level. After a very short low level period $T_{OFF}$, the dimming pulse S4 returns to high level again. In a case in which the dimming pulse S4 has such a short low level period $T_{OFF}$, the coil current $I_L$ cannot drop to zero within the low level period $T_{OFF}$. In this case, a next pulse Y occurs before the coil current $I_L$ drops to zero. This leads to a problem in that the switching transistor M1 turns on in a state in which the coil current $I_L$ is larger than zero, which is so-called hard switching, resulting in deviation from a quasi-resonant (QR) mode. This means that the load current $I_{LED}$ deviates from ½ of the peak $I_{LIM}$ of the coil current $I_L$, which means degradation of the precision of the analog dimming operation. The above is the first problem.

Next, description will be made with reference to FIG. 3C regarding the second problem. FIG. 3C shows the waveforms in a case in which the dimming pulse S4 transits to low level in a state in which a given pulse Z of the output pulse $S_{OUT}$ is set to high level before the coil current $I_L$ reaches the peak $I_{LIM}$. In this case, the final pulse Z has a higher frequency than those of the pulses generated before it. Such a change in frequency functions as noise depending on an application employing the switching converter 100r.

The aforementioned problems are characteristic problems of a circuit configuration in which a single switching transistor is shared by the PWM dimming switching operation and the DC/DC converter switching operation. It should be noted that the above-described problems are by no means within the scope of common and general knowledge in the field of the present invention. Furthermore, it can be said that the present inventor has been the first to arrive at these problems.

SUMMARY OF THE INVENTION

The present invention has been made in order to solve the aforementioned problems. Accordingly, it is an exemplary purpose of an embodiment of the present invention to provide a switching converter and a control circuit for the switching converter which are capable of solving at least one of the aforementioned problems.

An embodiment of the present invention relates to a control circuit for a switching converter that drives a light source. The switching converter comprises: an output capacitor arranged between an input line and an output line; an inductor, a switching transistor, and a detection resistor arranged in series between the output line and the ground line; and a diode having a cathode connected to the input line and an anode connected to a connection node that connects the inductor and the switching transistor. The control circuit comprises: a current limit comparator that asserts a reset pulse when a current detection signal that corresponds to a voltage drop across the detection resistor exceeds a setting value; a zero current detection circuit that asserts a set pulse when a current that flows through the inductor becomes substantially zero; a logic circuit that receives the set pulse and the reset pulse, and that generates a control pulse such that (i) when the set pulse is asserted, the control pulse is switched to an on level that corresponds to an on state of the switching transistor, and such that (ii) when the reset pulse is asserted, the control pulse is switched to an off level that corresponds to an off state of the switching transistor; a pulse dimming terminal that receives a dimming pulse having a duty ratio that is adjusted according to a target luminance set for the light source; a dimming pulse adjustment unit that receives the dimming pulse and a signal that corresponds to the control pulse, and that generates an adjusted dimming pulse such that, when a transition occurs in the dimming pulse from the on level to the off level during a period in which the control pulse is set to the on level, the transition is delayed up to a next off-level period of the control pulse; and an output unit that drives the switching transistor according to the control pulse during a period in which the adjusted dimming pulse is set to the on level.

With such an embodiment, by adjusting the dimming pulse using the control pulse, such an arrangement is capable of preventing hard switching in which the switching transistor switches in a state in which the coil current that flows through the inductor is not zero, and/or of suppressing fluctuation of the frequency of the control pulse.

Also, the dimming pulse adjustment unit may not adjust the dimming pulse until a leading and subsequent (N−1) control pulses have been generated in each period of the dimming pulse. Such an arrangement provides improved dimming precision in a range in which the dimming pulse has a small duty ratio.

Also, the predetermined number N may be set to 1. Also, the predetermined number N may be set to 2 or more.

Also, the dimming pulse adjustment unit may comprise: a mask signal generating unit that generates a mask signal which is set to a predetermined level until the leading and subsequent (N−1) control pulses are generated in each period of the dimming pulse; and a first logic gate that performs a logical operation on the mask signal and the dimming pulse so as to generate the adjusted dimming pulse.

Also, the mask signal generating unit may comprise: a flip-flop that receives a signal that corresponds to the control pulse via a clock terminal and a reset terminal thereof; a counter that receives a signal that corresponds to the control pulse via a clock terminal thereof, that receives the dimming pulse via a reset terminal thereof, and that asserts a count end signal when the count value reaches the value N; and a second logic gate that performs a logical operation on the count end signal and an output of the flip-flop.

Also, a mask period may be set to a predetermined period from a time point at which the switching transistor turns on. Also, the control circuit according to an embodiment may further comprise a leading edge blanking circuit that masks assertion of the reset pulse during the mask period, and that outputs a masked reset pulse to the logic circuit.

Also, the switching converter may further comprise a first capacitor and a first resistor arranged in series between a ground line and a connection node that connects the inductor and the switching transistor. Also, when an electric potential at the first resistor crosses a predetermined threshold voltage, the zero current detection circuit may assert the set pulse.

Also, the switching converter may further comprise an auxiliary winding coupled with the inductor. Also, when a voltage that develops at the auxiliary winding crosses a predetermined threshold voltage, the zero current detection circuit may assert the set pulse.

Also, the control circuit may monolithically be integrated on a single semiconductor substrate.

Examples of such a "monolithically integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants.

Another embodiment of the present invention relates to a switching converter. The switching converter comprises any one of the aforementioned control circuits.

Yet another embodiment of the present invention relates to an illumination apparatus. The illumination apparatus comprises: an LED light source comprising multiple LEDs (light-emitting diodes) connected in series; a rectifier circuit that rectifies and smooths a commercial AC voltage; and a switching converter that receives, as an input voltage, a DC voltage obtained by rectification and smoothing by means of the rectifier circuit. The switching converter may comprise any one of the aforementioned control circuits.

Yet another embodiment of the present invention relates to an electronic device. The electronic device may comprise: a liquid crystal panel; and the aforementioned illumination apparatus configured as a backlight that irradiates a back face of the liquid crystal panel.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

Figure 4:
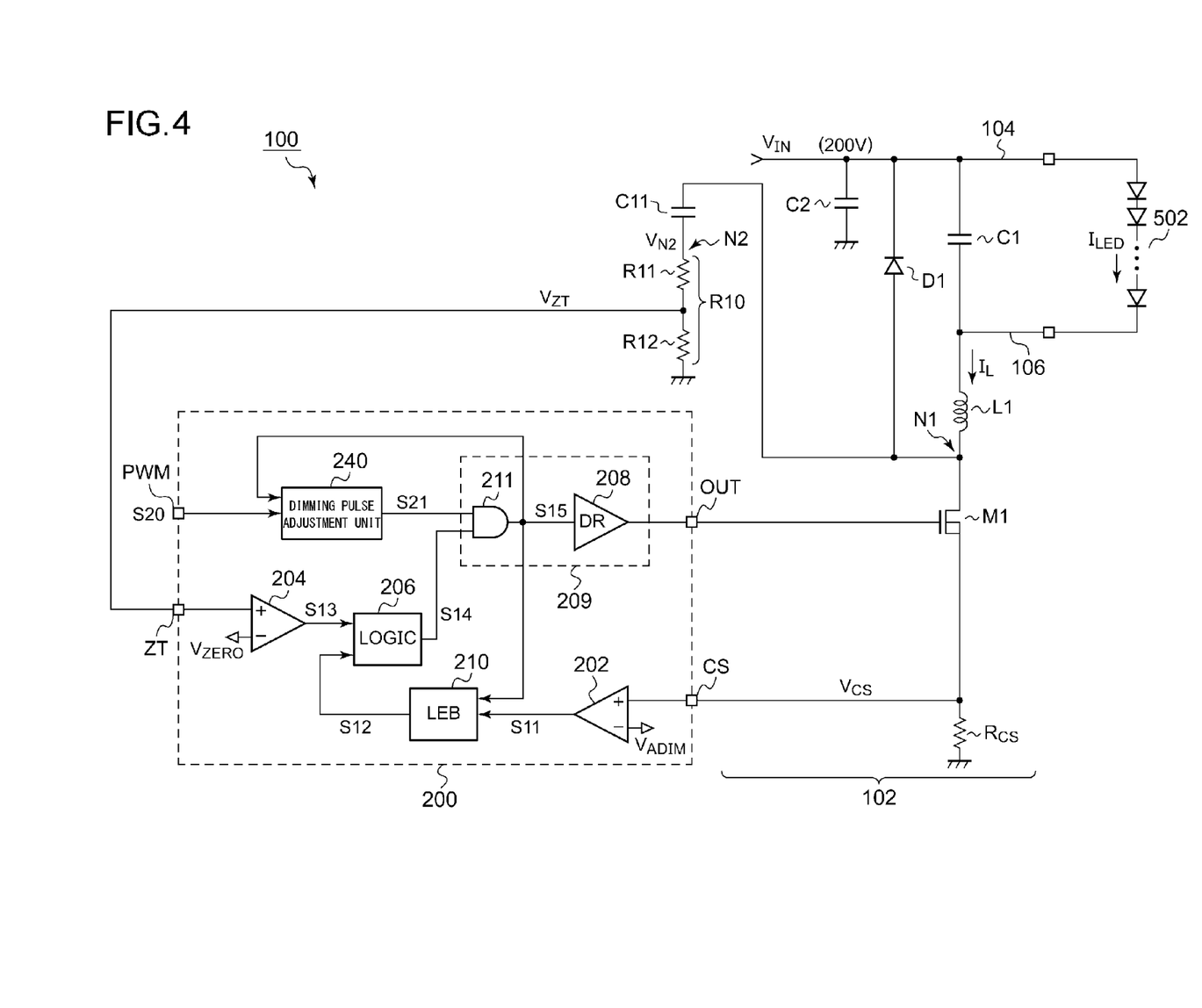
FIG. 4 is a circuit diagram showing a configuration of a switching converter according to an embodiment.

FIG. 4 is a circuit diagram showing a configuration of a switching converter 100 according to an embodiment. The switching converter 100 is a step-down converter (back converter) that steps down an input voltage $V_{IN}$ input via an input line 104, and that outputs an output voltage $V_{OUT}$ thus stepped down via an output line 106. An LED light source 502 is arranged such that its one end (anode) is connected to the input line 104 and its other end (cathode) is connected to the output line 106. A driving voltage ($V_{IN}$–$V_{OUT}$) is supplied across the LED light source 502.

The LED light source 502 is configured as a device to be driven using a constant current. Thus, the switching converter 100 stabilizes a current $I_{LED}$ that flows through the LED light source 502 to a target value. For example, the LED light source 502 may be configured as an LED string including multiple light-emitting elements (LEDs) connected in series. The switching converter 100 stabilizes the current $I_{LED}$ that flows through the LED light source 502 to a target current $I_{REF}$ that corresponds to a target luminance.

The output circuit 102 includes a smoothing capacitor C1, an input capacitor C2, a rectifier diode D1, a switching transistor M1, an inductor L1, and a detection resistor $R_{CS}$. The smoothing capacitor C1 is arranged such that its one end is connected to the input line 104 and its other end is connected to the output line 106.

The inductor L1 is arranged such that its one end is connected to the output line 106 and its other end is connected to the drain of the switching transistor M1. The detection resistor $R_{CS}$ is arranged on a path of the current $I_L$ that flows through the switching transistor M1 and the inductor L1 in a period in which the switching transistor M1 is turned on. The rectifier diode D1 is arranged such that its cathode is connected to the input line 104 and its anode is connected to a connection node N1 (drain) that connects the inductor L1 and the switching transistor M1.

The control circuit 200 is configured as a function IC (Integrated Circuit) monolithically integrated on a single semiconductor substrate. The control circuit 200 includes an output (OUT) terminal, a current detection (CS) terminal, an auxiliary (ZT) terminal, a ground (GND) terminal, and a pulse dimming (PWM) terminal. The GND terminal is grounded. The OUT terminal is connected to the gate of the switching transistor M1. A current detection signal $V_{CS}$ that corresponds to a voltage drop across the detection resistor $R_{CS}$ is input to the CS terminal. The switching transistor M1 may be built into the control circuit 200.

The control circuit 200 includes a current limit comparator 202, a zero current detection circuit 204, a logic circuit 206, an output unit 209, an LEB (Leading Edge Blanking) circuit 210, and a dimming pulse adjustment unit 240.

When the current detection signal $V_{CS}$ exceeds the setting value $V_{ADIM}$, i.e., when the coil current $I_L$ reaches the limit current $I_{LIM}$ that corresponds to the setting value $V_{ADIM}$, the current limit comparator 202 asserts a reset pulse S11 (set to high level, for example). The setting value $V_{ADIM}$ corresponds to the setting value used in an analog dimming operation.

The zero current detection circuit 204 generates a set pulse S13 configured as an instruction to turn on the switching transistor M1. The switching converter 100 shown in FIG. 4 is configured as a quasi-resonant (QR) converter. The switching transistor M1 performs a soft switching operation in which, when the coil current $I_L$ becomes zero, the switching transistor M1 is turned on. When the coil current $I_L$ becomes substantially zero, the zero current detection circuit 204 asserts (sets to high level, for example) the set pulse S13.

The capacitor C11 and the resistor R10 are provided in order to detect the coil current $I_L$. When the voltage $V_{N2}$ at a connection node N2 that connects the capacitor C11 and the resistor R10 crosses a threshold value which is set in the vicinity of zero, the zero current detection circuit 204 asserts the set pulse S13. The voltage $V_{N2}$ at the connection node N2 may be directly input to the ZT terminal. Also, a voltage obtained by dividing the voltage $V_{N2}$ by means of resistors R11 and R12 may be input to the ZT terminal.

The zero current detection circuit 204 includes a comparator. When the voltage $V_{ZT}$ at the ZT terminal crosses a threshold voltage $V_{ZERO}$ which is set in the vicinity of zero, the comparator asserts (sets to high level, for example) the set pulse S13.

The LEB circuit 210 sets a mask period for a predetermined period (mask time) from the time point at which the switching transistor M1 turns on. During the mask period, the assertion of the reset pulse S11 is masked, i.e., is ignored. Specifically, the LEB circuit 210 outputs a masked reset pulse S12 to the logic circuit 206. That is to say, the mask time set by the LEB circuit 210 determines the minimum width of the on time of the switching transistor M1.

The configuration of the LEB circuit 210 is not restricted in particular. That is to say, the LEB circuit 210 may be configured using known techniques. For example, the LEB circuit 210 may be configured using a timer circuit and a gate element. The timer circuit generates a mask signal which is set to a predetermined level during a mask time from the time point at which the switching transistor M1 turns on. The gate element performs a logical operation on the mask signal and the reset pulse S11 so as to generate the masked reset pulse S12.

The logic circuit 206 receives the set pulse S13 and the reset pulse S12, and generates a control pulse S14. (i) When the set pulse S13 is asserted, the control pulse S14 transits to an on level (e.g., high level) that corresponds to the on state of the switching transistor M1. (ii) When the reset pulse S12 is asserted, the control pulse S14 transits to an off level (e.g., low level) that corresponds to the off state of the switching transistor M1.

A dimming pulse S20 having a duty ratio that is adjusted according to the target luminance of the LED light source 502 is input to the PWM terminal. The dimming pulse adjustment unit 240 receives the dimming pulse S20 and the signal S15 that corresponds to the control pulse S14, and generates an adjusted dimming pulse S21. When a transition (i.e., negative edge) occurs in the dimming pulse S20 from the on level (e.g., high level) to the off level (e.g., low level) during a period in which the control pulse S14 is set to the on level, the dimming pulse adjustment unit 240 delays this transition (negative edge) up to the next off period of the control pulse S14. More specifically, the dimming pulse adjustment unit 240 may delay the negative edge of the dimming pulse S20 up to a negative edge of the control pulse S14.

During a period in which the adjusted dimming pulse S21 is set to the on level (high level), the output unit 209 drives the switching transistor M1 according to the control pulse S14. Conversely, during a period in which the adjusted dimming pulse S21 is set to the off level, the switching transistor M1 is fixed to the off level. For example, the output unit 209 includes an AND gate 211 and a driver 208. The AND gate 211 performs a logical operation on the control pulse S14 and the adjusted dimming pulse S21 so as to generate a driving pulse S15. The driver 208 drives the switching transistor M1 according to the driving pulse S15. The driving pulse S15 has a logical level that corresponds to the control pulse S14.

Figure 5A:
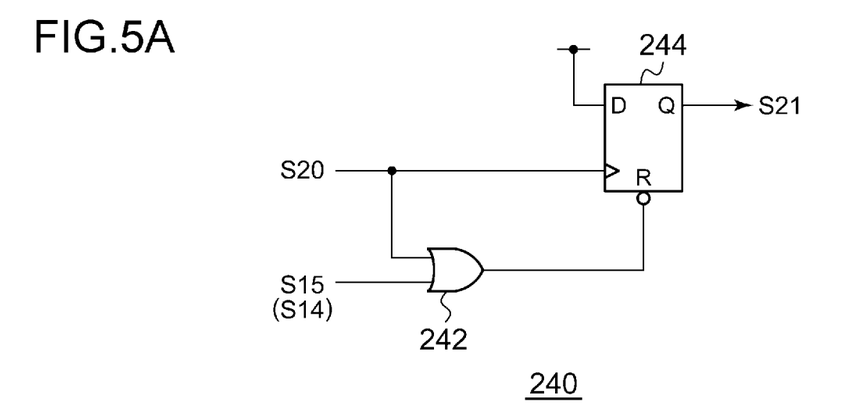
FIGS. 5A and 5B are circuit diagram each showing an example configuration of a dimming pulse adjustment unit.
Figure 5B:
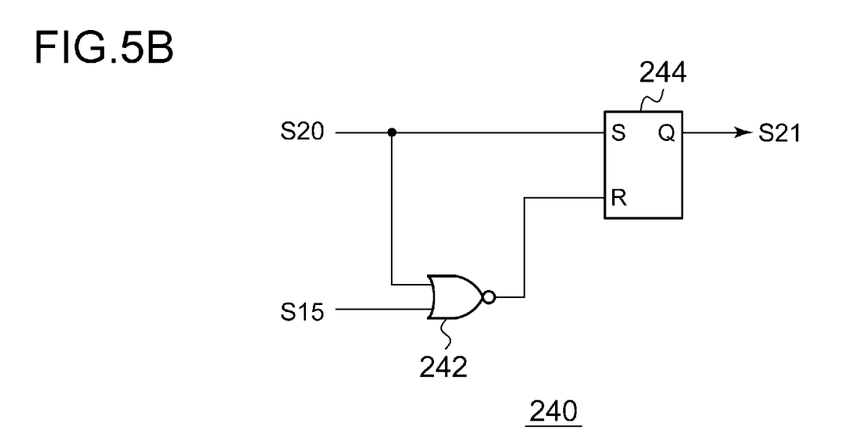

FIGS. 5A and 5B are circuit diagrams each showing an example configuration of the dimming pulse adjustment unit 240. The dimming pulse adjustment units 240 shown in FIGS. 5A and 5B each include a logic gate 242 and a flip-flop 244. The logic gate 242 shown in FIG. 5A is configured as an OR gate. With such an arrangement, the logic gate 242 generates the logical OR of the dimming pulse S20 and the control pulse S14 (driving pulse S15). The flip-flop 244 shown in FIG. 5A is configured as a D flip-flop. The flip-flop 244 is arranged such that the dimming pulse S20 is input to its clock terminal and the output of the logic gate 242 is input to its reset terminal (logical inversion). The flip-flop 244 outputs the adjusted dimming pulse S21 obtained by delaying the negative edge of the dimming pulse S20 up to a low-level period of the driving pulse S15.

The logic gate 242 shown in FIG. 5B is configured as a NOR gate. With such an arrangement, the logic gate 242 generates the logical NOR of the dimming pulse S20 and the control pulse S14 (driving pulse S15). The flip-flop 244 shown in FIG. 5B is configured as an RS flip-flop. In this case, the flip-flop 244 is arranged such that the dimming pulse S20 is input to its set terminal and the output of the logic gate 242 is input to its reset terminal. The flip-flop 244 outputs the adjusted dimming pulse S21 obtained by delaying the negative edge of the dimming pulse S20 up to a low-level period of the driving pulse S15. Also, various kinds of modifications may be made for the dimming pulse adjustment unit 240, which can be clearly understood by those skilled in this art.

Figure 6A:
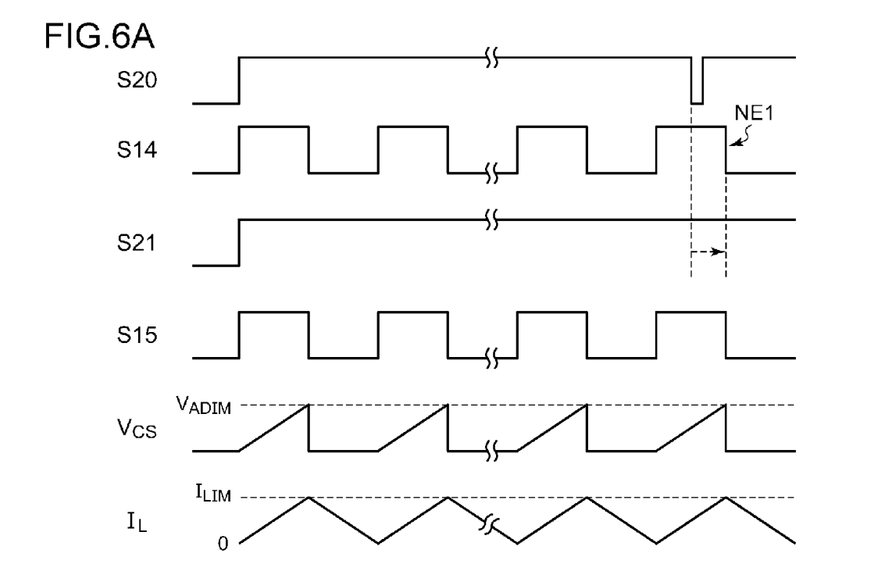
FIGS. 6A and 6B are operation waveform diagrams each showing the operation of the switching converter shown in FIG. 4.
Figure 6B:
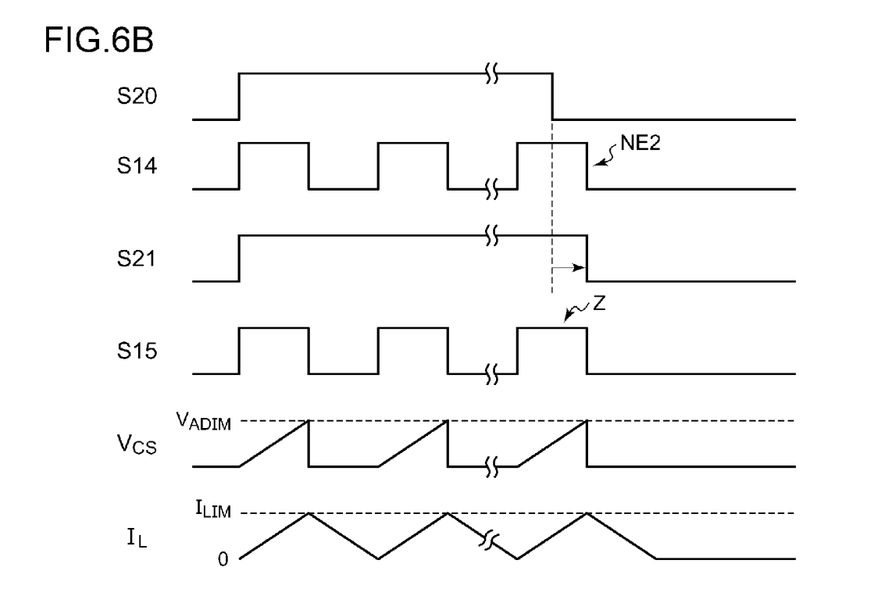

The above is the configuration of the control circuit 200. Next, description will be made regarding the operation thereof. FIGS. 6A and 6B are operation waveform diagrams each showing the operation of the switching converter 100 shown in FIG. 4. FIG. 6A shows a state in which the dimming pulse S20 has a duty ratio of almost 100%. In this case, a negative edge occurs in the dimming pulse S20 in a high-level of the control pulse S14 (S15). Thus, the dimming pulse adjustment unit 240 delays the negative edge of the dimming pulse S20 up to the next negative edge NE1 of the control pulse S14, so as to generate the adjusted dimming pulse S21. As a result, the duty ratio of the adjusted dimming pulse S21 is extended to 100%.

Such an arrangement provides a hard switching operation in which the coil current $I_L$ varies between zero and the limit current. That is to say, such an arrangement prevents the problem in soft switching as shown in FIG. 3B.

FIG. 6B shows the waveforms in a case in which the dimming pulse S20 transits to low level before the coil current $I_L$ reaches the peak $I_{LIM}$ in a period in which the control pulse S14 is set to high level. In this case, a negative edge occurs in the dimming pulse S20 in a high-level period of the control pulse S14 (S15). The dimming pulse adjustment unit 240 delays the negative edge of the dimming pulse S20 up to the next negative edge NE2 of the control pulse S14, so as to generate the adjusted dimming pulse S21. As a result, the duty ratio of the control pulse S14 is extended to 100%.

With such an arrangement, the period of the final pulse Z is substantially the same as those of the previous pulses, thereby suppressing frequency fluctuation.

As described above, with the switching converter 100 according to the embodiment, such an arrangement is capable of solving at least one of the problems that can occur in an illumination apparatus 500 having a configuration in which a single switching transistor is shared by the PWM dimming switching operation and the DC/DC converter switching operation.

The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

First Modification

Figure 7A:
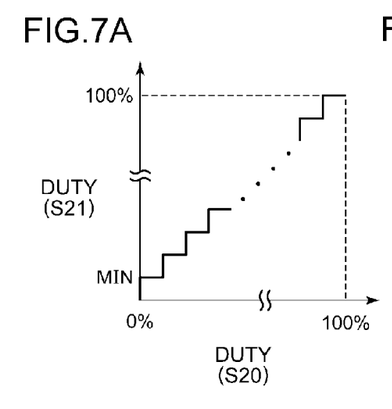
FIG. 7A is a diagram showing the relation between a dimming pulse and an adjusted dimming pulse in the switching converter shown in FIG. 4.

Description has been made in the embodiment regarding an arrangement in which the dimming pulse adjustment unit 240 adjusts the dimming pulse S20 regardless of the duty ratio (pulse width). FIG. 7A is a diagram showing the relation between the dimming pulse S20 and the adjusted dimming pulse S21 in the switching converter 100 shown in FIG. 4. The adjusted dimming pulse S21 represented by the vertical axis can also be understood as the light amount (luminance) of the LED light source 502. That is to say, with the switching converter 100 shown in FIG. 4, such an arrangement is not capable of providing the adjusted dimming pulse S21 having a duty ratio that is smaller than a predetermined minimum value MIN. Furthermore, such an arrangement has a problem in that the light amount can be changed only in a discrete manner in a range in which the dimming pulse S20 has a low duty ratio.

Figure 7B:
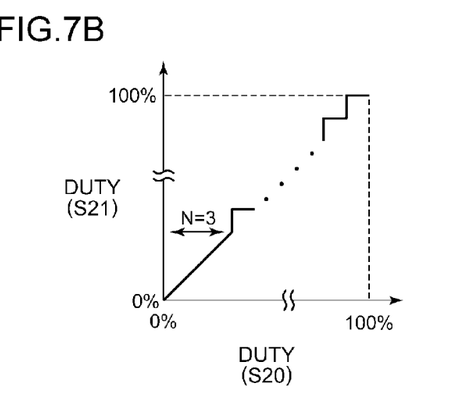
FIG. 7B is a diagram showing the relation between a dimming pulse and an adjusted dimming pulse in a switching converter 100 according to a first modification.

In order to solve this problem, in the first modification, the adjustment operation of the dimming pulse adjustment unit 240 is switched between the on state and off state according to the duty ratio of the dimming pulse S20. Specifically, the dimming pulse adjustment unit 240 outputs the dimming pulse S20 as-is and without adjustment until the leading and subsequent (N−1) control pulses S14 have been generated in each period of the dimming pulse S20. With such an arrangement, N may be set to 1, or otherwise, N may be set to 2 or more. In other words, the dimming pulse adjustment unit 240 outputs the dimming pulse S20 as-is and without adjustment until at least the leading control pulse S14 has been generated in each period of the dimming pulse S20. FIG. 7B is a diagram showing the relation between the dimming pulse S20 and the adjusted dimming pulse S21 in the switching converter 100 according to the first modification. FIG. 7B shows an arrangement in which N=3.

Figure 8:
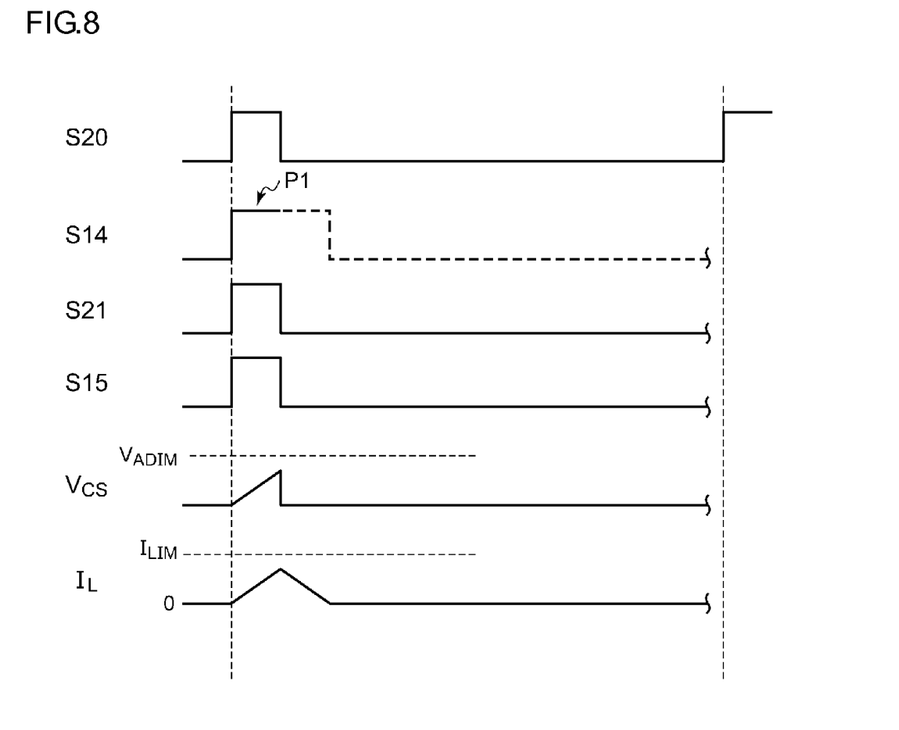
FIG. 8 is an operation waveform diagram showing the operation of the switching converter according to the first modification.

FIG. 8 is an operation waveform diagram showing the operation of the switching converter 100 according to the first modification. FIG. 8 shows the operation in a case in which the dimming pulse S20 transits to the off level in a period in which the leading pulse P1 is in the high-level state, i.e., before the coil current $I_L$ reaches the limit current $I_{LIM}$. In this case, the dimming pulse adjustment unit 240 does not delay the edge of the dimming pulse S20. In other words, the dimming pulse adjustment unit 240 outputs the dimming pulse S20 as the adjusted dimming pulse S21 as-is. As a result, at the same timing of the negative edge of the dimming pulse S20, the driving pulse S15 transits to low level, which turns off the switching transistor M1.

Such a modification allows the PWM dimming to be performed in a range that is lower than the minimum value MIN shown in FIG. 7A. Furthermore, such a modification allows the light amount to be continuously changed in a range in which the dimming pulse S20 has a small duty ratio (pulse width).

Figure 9:
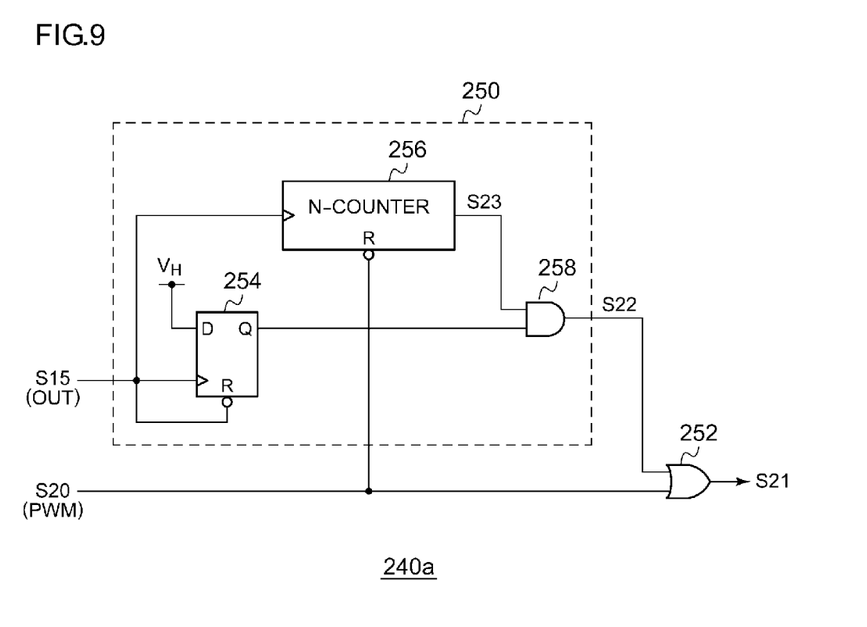
FIG. 9 is a circuit diagram showing a dimming pulse adjustment unit according to the first modification.

FIG. 9 is a circuit diagram showing a dimming pulse adjustment unit 240a according to the first modification. The dimming pulse adjustment unit 240a includes a mask signal generating unit 250 and a first logic gate 252. The mask signal generating unit 250 generates a mask signal S22 which is set to a predetermined level (high level) until the N control pulses S14 are generated from the start point of each period of the dimming pulse S20. The first logic gate 252 performs a logical operation on the mask signal S22 and the dimming pulse S20 so as to generate the adjusted dimming pulse S21.

For example, the mask signal generating unit 250 includes a flip-flop 254, a counter 256, and a second logic gate 258. The flip-flop 254 receives the driving pulse S15 that corresponds to the control pulse S14 via its clock terminal and reset terminal (logical inversion).

The counter 256 receives a signal (driving pulse S15) that corresponds to the control pulse S14 via its clock terminal, and counts up with every driving pulse S15. The dimming pulse S20 is input to the reset terminal (logical inversion) of the counter 256. The count value of the counter 256 is reset every time the dimming pulse S20 transits to low level. When the count value of the counter 256 reaches a predetermined value N, the counter 256 asserts (e.g., sets to high level) a count end signal S23.

The second logic gate 258 performs a logical operation on the count end signal S23 and the output of the flip-flop 254, so as to generate the adjusted dimming pulse S21. For example, the second logic gate 258 is configured as an OR gate. It should be noted that the configuration of the dimming pulse adjustment unit 240a is not restricted to such a configuration shown in FIG. 9.

Second Modification

Figure 10:
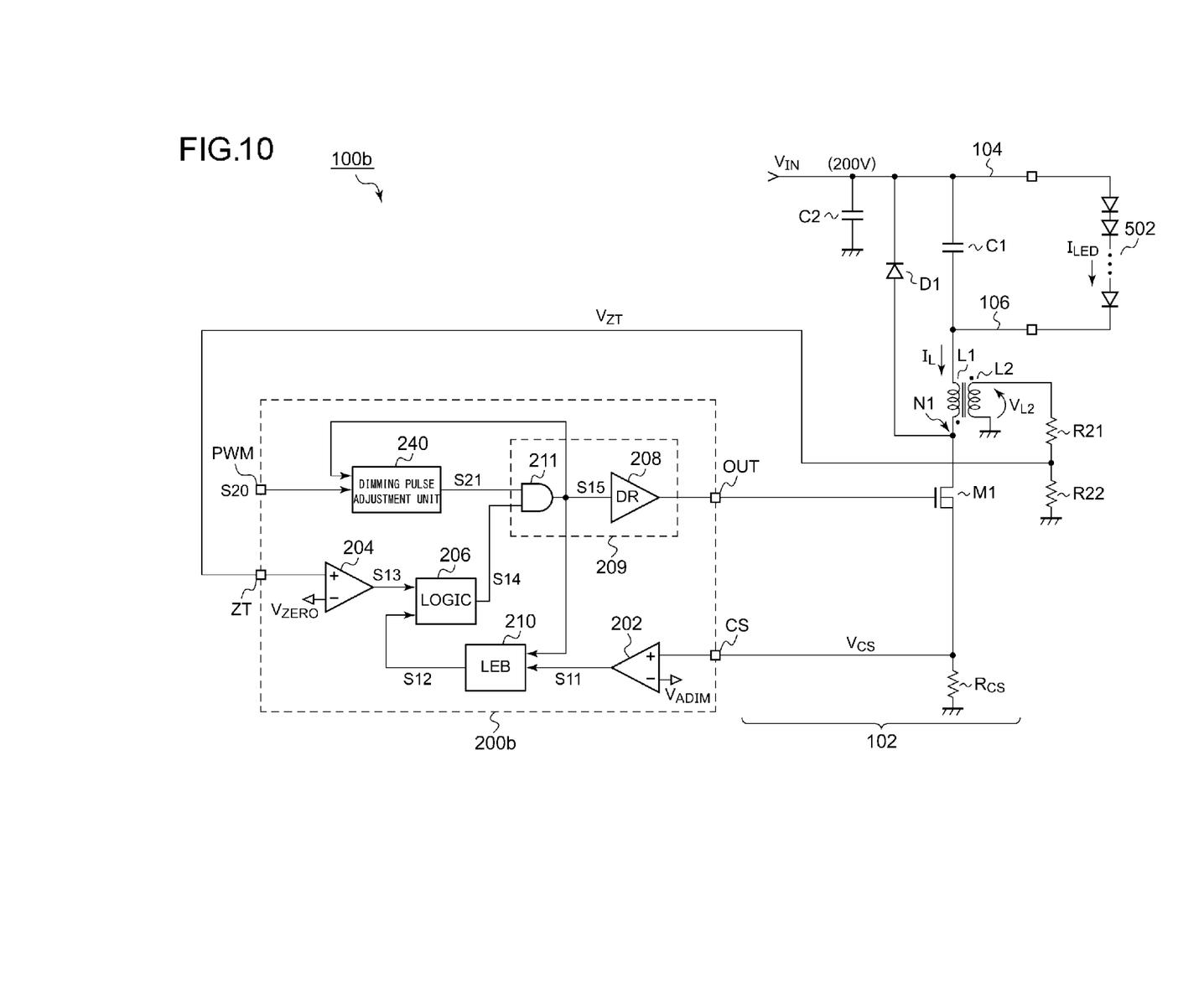
FIG. 10 is a circuit diagram showing a switching converter according to a second modification.

FIG. 10 is a circuit diagram showing a switching converter 100b according to a second modification. The switching converter 100b includes an auxiliary winding L2 coupled with the inductor L1, instead of the capacitor C11 and the resistor R10. The voltage $V_{ZT}$, which corresponds to a voltage $V_{L2}$ across the auxiliary winding L2, is input to the ZT terminal of the control circuit 200b. When the voltage $V_{ZT}$, which corresponds to a voltage at the auxiliary winding L2, crosses a predetermined threshold voltage $V_{ZERO}$, a zero current detection circuit (set pulse generator) 204 asserts the set pulse S13. Such a configuration also provides a quasi-resonant mode.

Third Modification

Description has been made in the embodiments regarding an arrangement in which the LED light source 502 is configured as an LED string. However, the kind of such a load is not restricted in particular.

Fourth Modification

The settings of the signals in a logic circuit, such as the high-level state and the low-level state of the signals, have been described in the present embodiments for exemplary purposes only. The settings can be freely modified by inverting the signals using inverters or the like.

Also, various kinds of combinations of the aforementioned embodiments and modifications may be made, which are also effective as an embodiment of the present invention.

Figure 11:
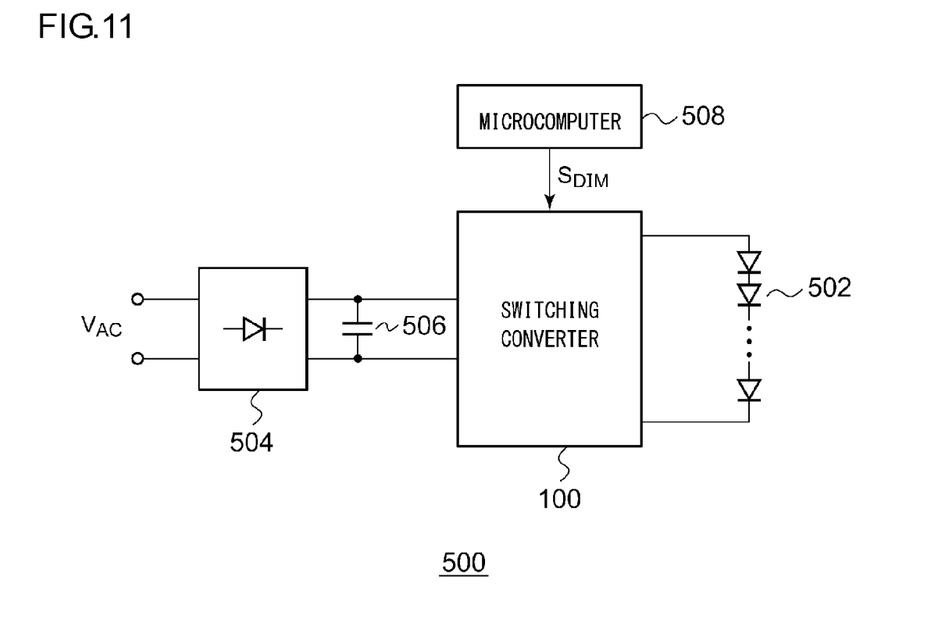
FIG. 11 is a block diagram showing an illumination apparatus employing a switching converter.

Lastly, description will be made regarding the usage of the switching converter 100. FIG. 11 is a block diagram showing the illumination apparatus 500 employing the switching converter 100. The illumination apparatus 500 includes a rectifier circuit 504, a smoothing capacitor 506, and a microcomputer 508, in addition to the LED light source 502 configured as a light emitting unit and the switching converter 100. A commercial AC voltage $V_{AC}$ is converted into a DC voltage $V_{DC}$ by rectifying and smoothing the commercial AC voltage $V_{AC}$ by means of the rectifier circuit 504 and the smoothing capacitor 506. The microcomputer 508 generates a control signal $S_{DIM}$ which indicates the luminance to be provided by the LED light source 502. The switching converter 100 receives the DC voltage $V_{DC}$ as an input signal $V_{IN}$, and supplies the driving current $I_{LED}$ that corresponds to the control signal $S_{DIM}$ to the LED light source 502.

Figure 12A:
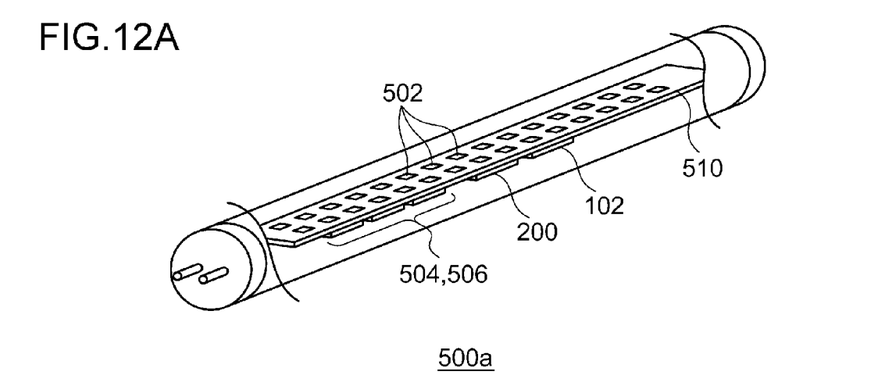
FIGS. 12A through 12C are diagrams each showing a specific example of an illumination apparatus.
Figure 12B:
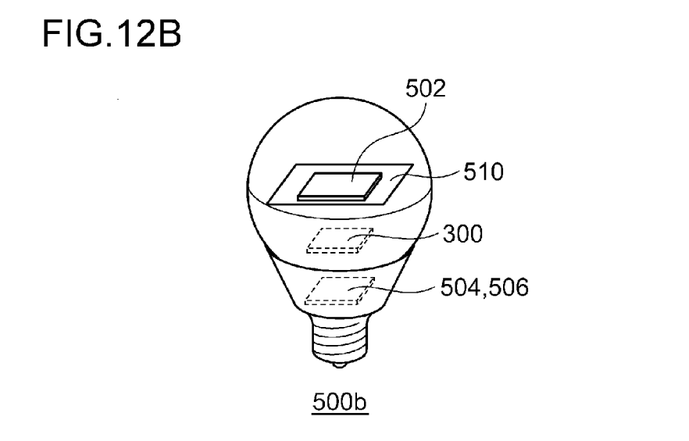
Figure 12C:
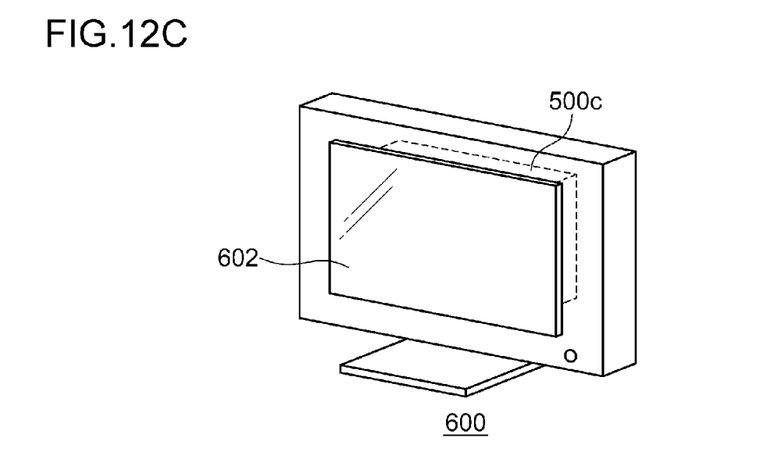

FIGS. 12A through 12C are diagrams each showing a specific example of the illumination apparatus 500. It should be noted that FIGS. 12A through 12C do not show all the components, i.e., a part of such components is not shown. FIG. 12A shows an illumination apparatus 500a configured as a straight-tube-type LED illumination device. Multiple LED elements that form an LED string configured as the LED light source 502 are laid out on a substrate 510. Also, the rectifier circuit 504, the control circuit 200, the output circuit 102, and the like are mounted on the substrate 510.

FIG. 12B shows an illumination apparatus 500b configured as a bulb-type LED illumination device. An LED module configured as the LED light source 502 is mounted on the substrate 510. The control circuit 200 and the rectifier circuit 504 are mounted within a housing of the illumination apparatus 500b.

FIG. 12C shows an illumination apparatus 500c configured as a backlight built into a liquid crystal display apparatus 600. The illumination apparatus 500c irradiates the back face of a liquid crystal panel 602.

Aldo, the illumination apparatus 500 may be employed as a ceiling light. As described above, the illumination apparatus 500 shown in FIG. 11 is applicable to various kinds of usages.

While the preferred embodiments of the present invention have been described using specific terms, such description is for illustrative purposes only, and it is to be understood that changes and variations may be made without departing from the spirit or scope of the appended claims.

What is claimed is:
1. A control circuit for a switching converter that drives a light source, the switching converter comprising:
    an output capacitor arranged between an input line and an output line;
    an inductor, a switching transistor, and a detection resistor arranged in series between the output line and a ground line; and
    a diode having a cathode connected to the input line and an anode connected to a connection node that connects the inductor and the switching transistor,
    and wherein the control circuit comprises:
        a current limit comparator that asserts a reset pulse when a current detection signal that corresponds to a voltage drop across the detection resistor exceeds a setting value;
        a zero current detection circuit that asserts a set pulse when a current that flows through the inductor becomes substantially zero;
        a logic circuit that receives the set pulse and the reset pulse, and that generates a control pulse such that (i) when the set pulse is asserted, the control pulse is switched to an on level that corresponds to an on state of the switching transistor, and such that (ii) when the reset pulse is asserted, the control pulse is switched to an off level that corresponds to an off state of the switching transistor;
        a pulse dimming terminal that receives a dimming pulse having a duty ratio that is adjusted according to a target luminance set for the light source;
        a dimming pulse adjustment unit that receives the dimming pulse and a signal that corresponds to the control pulse, and that generates an adjusted dimming pulse such that, when a transition occurs in the dimming pulse from the on level to the off level during a period in which the control pulse is set to the on level, the transition is delayed up to a next off-level period of the control pulse; and
        an output unit that drives the switching transistor according to the control pulse during a period in which the adjusted dimming pulse is set to the on level.
2. The control circuit according to claim 1, wherein the dimming pulse adjustment unit does not adjust the dimming pulse until a leading and subsequent (N−1) control pulses have been generated in each period of the dimming pulse.
3. The control circuit according to claim 2, wherein the dimming pulse adjustment unit comprises:
    a mask signal generating unit that generates a mask signal which is set to a predetermined level until the leading and subsequent (N−1) control pulses are generated in each period of the dimming pulse; and
    a first logic gate that performs a logical operation on the mask signal and the dimming pulse so as to generate the adjusted dimming pulse.

4. The control circuit according to claim 3, wherein the mask signal generating unit comprises:
   a flip-flop that receives a signal that corresponds to the control pulse via a clock terminal and a reset terminal thereof;
   a counter that receives a signal that corresponds to the control pulse via a clock terminal thereof, that receives the dimming pulse via a reset terminal thereof, and that asserts a count end signal when the count value reaches the value N; and
   a second logic gate that performs a logical operation on the count end signal and an output of the flip-flop.

5. The control circuit according to claim 1, wherein a mask period is set to a predetermined period from a time point at which the switching transistor turns on,
   and wherein the control circuit further comprises a leading edge blanking circuit that masks assertion of the reset pulse during the mask period, and that outputs a masked reset pulse to the logic circuit.

6. The control circuit according to claim 1, wherein the switching converter further comprises a first capacitor and a first resistor arranged in series between a ground line and a connection node that connects the inductor and the switching transistor,
   and wherein, when an electric potential at the first resistor crosses a predetermined threshold voltage, the zero current detection circuit asserts the set pulse.

7. The control circuit according to claim 1, wherein the switching converter further comprises an auxiliary winding coupled with the inductor,
   and wherein, when a voltage that develops at the auxiliary winding crosses a predetermined threshold voltage, the zero current detection circuit asserts the set pulse.

8. The control circuit according to claim 1, monolithically integrated on a single semiconductor substrate.

9. A switching converter comprising the control circuit according to claim 1.

10. An illumination apparatus comprising:
   an LED light source comprising a plurality of LEDs (light-emitting diodes) connected in series;
   a rectifier circuit that rectifies and smooths a commercial AC voltage; and
   a switching converter that receives, as an input voltage, a DC voltage obtained by rectification and smoothing by means of the rectifier circuit,
   and wherein the switching converter comprises the control circuit according to claim 1.

11. An electronic device comprising:
   a liquid crystal panel; and
   the illumination apparatus according to claim 10, configured as a backlight that irradiates a back face of the liquid crystal panel.

12. A control method for a switching converter that drives a light source, the switching converter comprising:
   an output capacitor arranged between an input line and an output line;
   an inductor, a switching transistor, and a detection resistor arranged in series between the output line and the ground line; and
   a diode having a cathode connected to the input line and an anode connected to a connection node that connects the inductor and the switching transistor,
   and wherein the control method comprises:
      asserting a reset pulse when a current detection signal that corresponds to a voltage drop across the detection resistor exceeds a setting value;
      asserting a set pulse when a current that flows through the inductor becomes substantially zero;
      generating a control pulse based on the set pulse and the reset pulse such that (i) when the set pulse is asserted, the control pulse is switched to an on level that corresponds to an on state of the switching transistor, and such that (ii) when the reset pulse is asserted, the control pulse is switched to an off level that corresponds to an off state of the switching transistor;
      generating a dimming pulse having a duty ratio that is adjusted according to a target luminance set for the light source;
      generating an adjusted dimming pulse by adjusting the dimming pulse using the control pulse such that, when a transition occurs in the dimming pulse from the on level to the off level during a period in which the control pulse is set to the on level, the transition is delayed up to a next off-level period of the control pulse; and
      driving the switching transistor according to the control pulse during a period in which the adjusted dimming pulse is set to the on level.

\* \* \* \* \*